United States Patent
Fanning et al.

(10) Patent No.: US 11,042,297 B2
(45) Date of Patent: *Jun. 22, 2021

(54) TECHNIQUES TO CONFIGURE A SOLID STATE DRIVE TO OPERATE IN A STORAGE MODE OR A MEMORY MODE

(71) Applicant: Intel Corporation, Santa Clara, CA (US)

(72) Inventors: Blaise Fanning, Folsom, CA (US); Mark A. Schmisseur, Phoenix, AZ (US); Raymond S. Tetrick, Portland, OR (US); Robert J. Royer, Jr., Portland, OR (US); David B. Minturn, Hillsboro, OR (US); Shane Matthews, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/417,310

(22) Filed: May 20, 2019

(65) Prior Publication Data
US 2019/0339869 A1 Nov. 7, 2019

Related U.S. Application Data

(63) Continuation of application No. 15/618,170, filed on Jun. 9, 2017, now Pat. No. 10,296,217, which is a
(Continued)

(51) Int. Cl.
*G06F 3/06* (2006.01)
*G06F 12/02* (2006.01)
(Continued)

(52) U.S. Cl.
CPC .......... *G06F 3/0604* (2013.01); *G06F 3/0629* (2013.01); *G06F 3/0632* (2013.01);
(Continued)

(58) Field of Classification Search
CPC ............ G06F 12/0246; G06F 12/0638; G06F 12/0875; G06F 3/061; G06F 3/064; G06F 3/0659; G06F 3/0665; G06F 3/0679
(Continued)

(56) References Cited

U.S. PATENT DOCUMENTS 8,307,151 B1 11/2012 Caraccio et al.
8,588,228 B1 11/2013 Onufryk et al.
(Continued)

FOREIGN PATENT DOCUMENTS

| CN | 102165409 A | 8/2011 |
|---|---|---|
| GB | 2433333 A | 6/2007 |
| JP | 2007164793 A | 6/2007 |

OTHER PUBLICATIONS

English Translation of State Intellectual Property Office, P.R. China, Third Office Action, Patent Application No. 201380060901.3, 5 pages.
(Continued)

*Primary Examiner* — Gary J Portka
(74) *Attorney, Agent, or Firm* — Compass IP Law PC

(57) ABSTRACT

Examples are disclosed for configuring a solid state drive (SSD) to operate in a storage mode or a memory mode. In some examples, one or more configuration commands may be received at a controller for an SSD having one or more non-volatile memory arrays. The SSD may be configured to operate in at least one of a storage mode, a memory mode or a combination of the storage mode or the memory mode based on the one or more configuration commands. Other examples are described and claimed.

25 Claims, 7 Drawing Sheets

Related U.S. Application Data continuation of application No. 14/789,816, filed on Jul. 1, 2015, now Pat. No. 9,678,666, which is a continuation of application No. 13/725,502, filed on Dec. 21, 2012, now Pat. No. 9,098,402.

(51) Int. Cl.
*G06F 13/16* (2006.01)
*G06F 13/28* (2006.01)

(52) U.S. Cl.
CPC .......... *G06F 3/0634* (2013.01); *G06F 3/0644* (2013.01); *G06F 3/0679* (2013.01); *G06F 3/0688* (2013.01); *G06F 12/0246* (2013.01); *G06F 13/16* (2013.01); *G06F 13/28* (2013.01); *G06F 3/0664* (2013.01); *G06F 2212/7206* (2013.01)

(58) Field of Classification Search
USPC ................................ 711/103, 114, 126, 162
See application file for complete search history.

(56) References Cited

U.S. PATENT DOCUMENTS

| | | |
|---|---|---|
| 2007/0162650 A1 | 7/2007 | Bruce |
| 2008/0005462 A1 | 1/2008 | Pyeon |
| 2008/0282264 A1 | 11/2008 | Chen et al. |
| 2009/0024843 A1 | 1/2009 | Choi |
| 2009/0049234 A1 | 2/2009 | Oh et al. |
| 2011/0060869 A1 | 3/2011 | Schuette |
| 2011/0138118 A1 | 6/2011 | Cheong |
| 2011/0161597 A1 | 6/2011 | Tremaine et al. |
| 2012/0059980 A1 | 3/2012 | Klein |
| 2012/0173807 A1 | 7/2012 | Lasser |
| 2012/0246385 A1 | 9/2012 | Dhandapani et al. |
| 2013/0191693 A1 | 7/2013 | Ross et al. |
| 2014/0304475 A1 | 10/2014 | Ramanujan et al. |
| 2017/0185293 A1 | 6/2017 | Malikowski et al. |
| 2019/0042132 A1* | 2/2019 | Khan .................... G06F 3/0635 |

OTHER PUBLICATIONS

European Office Action for Patent Application No. 13865197.1, dated Sep. 25, 2019, 5 pages.
Extended European Search Report for Patent Application No. 13865197.1, dated Jul. 21, 2016, 8 pages.
Final Office Action for U.S. Appl. No. 14/789,816, dated Oct. 20, 2016, 11 pages.
Final Office Action for U.S. Appl. No. 15/618,170, dated Oct. 31, 2018, 6 pages.
International Search Report and Written Opinion for PCT Patent Application No. PCT/US2013/048414, dated Oct. 22, 2013, 11 pages.
Notice of Allowance for U.S. Appl. No. 13/725,502, dated Mar. 27, 2012, 5 pages.
Notice of Allowance for U.S. Appl. No. 13/725,502, dated May 28, 2015, 2 pages.
Notice of Allowance for U.S. Appl. No. 14/789,816, dated Feb. 6, 2017, 6 pages.
Office Action for U.S. Appl. No. 14/789,816, dated Mar. 30, 2016, 10 pages.
Office Action for U.S. Appl. No. 13/725,502, dated Dec. 22, 2014, 8 pages.
Office Action for U.S. Appl. No. 15/618,170, dated Apr. 4, 2018, 6 pages.
Office Action from State Intellectual Property Office, P.R. China, Patent Application No. 201380060901.3, 7 pages.
Office Action from State Intellectual Property Office, P.R. China, Patent Application No. 201380060901.3, 10 pages.
Office Action from State Intellectual Property Office, P.R. China, Patent Application No. 201380060901.3, 3 pages.

* cited by examiner

Logical Block Addres Table 310

| Logical Block Address | Physical Block Address |
|---|---|
| 312-1 | 330-1 |
| 312-2 | 330-2 |
| 312-3 | 330-p |
| 312-4 | 340-1 |
| 312-5 | 340-2 |
| 312-6 | 340-q |
| 312-7 | 350-1 |
| 312-8 | 350-2 |
| 312-9 | 350-r |

Rows 312-1 to 312-3: Memory Mode Assignment
Rows 312-4 to 312-9: Storage Mode Assignment

Physical Block Address Table 320

| Physical Block Address | Array |
|---|---|
| 330-1 | 120-1 |
| 330-2 | |
| ••• | |
| 330-p | |
| 340-1 | 120-2 |
| 340-2 | |
| ••• | |
| 340-q | |
| 350-1 | 120-n |
| 350-2 | |
| ••• | |
| 350-r | |

Rows 330-1 to 330-p: Partition 315
Rows 340-1 to 350-r: Partition 325

*FIG. 3*

Logical Block Address Table 410

| Logical Block Address | Physical Block Address | |
|---|---|---|
| 412-1 | 440-1 | Memory Mode Assignment |
| 412-2 | 440-2 | |
| 412-3 | 440-3 | |
| 412-4 | 430-1 | Storage Mode Assignment |
| 412-5 | 430-2 | |
| 412-6 | 430-p | |
| 412-7 | 440-1 | |
| 412-8 | 450-1 | |
| 412-9 | 450-2 | |
| 412-10 | 450-r | |

Physical Block Address Table 420

| Physical Block Address | Memory Array | |
|---|---|---|
| 430-1 | 120-1 | Partition 425 |
| 430-2 | | |
| ••• | | |
| 430-p | | |
| 440-1 | 120-2 | Partition 415 |
| 440-2 | | |
| ••• | | |
| 440-q | | |
| 450-1 | 120-n | Partition 425 |
| 450-2 | | |
| ••• | | |
| 450-r | | |

*FIG. 4*

TECHNIQUES TO CONFIGURE A SOLID STATE DRIVE TO OPERATE IN A STORAGE MODE OR A MEMORY MODE

CROSS-REFERENCE TO RELATED APPLICATIONS

This application is a continuation of U.S. patent application Ser. No. 15/618,170 filed Jun. 9, 2017, entitled "Techniques to Configure a Solid State Drive to Operate in a Storage Mode or a Memory Mode", which is now U.S. Pat. No. 10,296,217 which is a continuation of U.S. patent application Ser. No. 14/789,816 filed Jul. 1, 2015, entitled "Techniques to Configure a Solid State Drive to Operate in a Storage Mode or a Memory Mode", which is now U.S. Pat. No. 9,678,666, which is a continuation of U.S. patent application Ser. No. 13/725,502 filed Dec. 21, 2012, entitled "Techniques to Configure a Solid State Drive to Operate in a Storage Mode or a Memory Mode", which is now U.S. Pat. No. 9,098,402. The entire specification of which are hereby incorporated by reference in its entirety.

BACKGROUND

Computing devices to include host computing devices or systems may include the use of types of storage devices such as solid state drive (SSD) devices. These types of storage devices may include non-volatile memories such as NAND or NOR flash memory. SSD devices are increasingly being deployed as storage devices that augment or even replace hard disk drives used with host computing devices. Controllers for SSDs typically include a device driver, direct memory access capabilities and a hardware controller interface to communicate with or function as part of a host computer device. These types of controllers were designed under the assumption that reading to or writing from storage devices was much slower or had high latencies compared to that of processor circuitry at a host computing device. It is with respect to these and other challenges that the examples described herein are needed.

BRIEF DESCRIPTION OF THE DRAWINGS

FIG. 3 illustrates example first address tables.
FIG. 4 illustrates example second address tables.

DETAILED DESCRIPTION

According to some examples, newer types of non-volatile memories may reduce access latencies to a point that the role of SSDs as just storage devices may be reevaluated. For example memory architectures such as 3-dimensional (3-D) cross-point memory may be implemented in SSDs and may have access latencies significantly lower than NAND or NOR flash memory architectures. Also, recently adopted interconnect communication protocols have further reduced latencies for accessing SSDs. For example, interconnect communication protocols such as those described in industry standards or specifications (including progenies or variants) to include the Peripheral Component Interconnect (PCI) Express Base Specification, revision 3.0, published in November 2010 ("PCI Express" or "PCIe") and/or the Non-Volatile Memory Express (NVMe) Specification, revision 1.1, published in October 2012 have reduced protocol overhead. The reduced protocol overhead may result in lower access latencies associated with accessing storage devices coupling to host systems or host computing devices.

Faster types of non-volatile memories plus the introduction of new interconnect communication protocols now make it viable for a host computing system to use SSDs not only as storage devices but also to possibly augment system memory. System memory has traditionally included only volatile types of memory such as dynamic random access memory (DRAM). DRAM has access times that may be many times faster than hard disk drives traditionally used for storage. Additionally, controllers used with SSDs having faster types of non-volatile memories may still operate under the paradigm of a slower access time and also may use communication protocols having overhead that make it impractical to use SSDs with these types of controllers to augment system memory. It is with respect to these and other challenges that the examples described herein are needed.

In some examples, techniques associated with configuring an SSD to operate in a storage mode or a memory mode may be implemented. These techniques may include receiving one or more configuration commands to configure an SSD having one or more non-volatile memory arrays and configure the SSD to operate in a combination of a storage mode and a memory mode based on the one or more configuration commands. For these examples, the SSD may be operated in the storage mode by having direct memory access (DMA) capabilities to access one or more of the non-volatile memory arrays and also having a device programming interface to coordinate storage of data to at least a portion of the one or more non-volatile memory arrays via use of the DMA capabilities. Also, for these examples, the SSD may be operated in the memory mode by causing at least a portion of the one or more non-volatile memory arrays to be addressable via a memory mapping configuration command included in the received one or more configuration commands.

Figure 1:
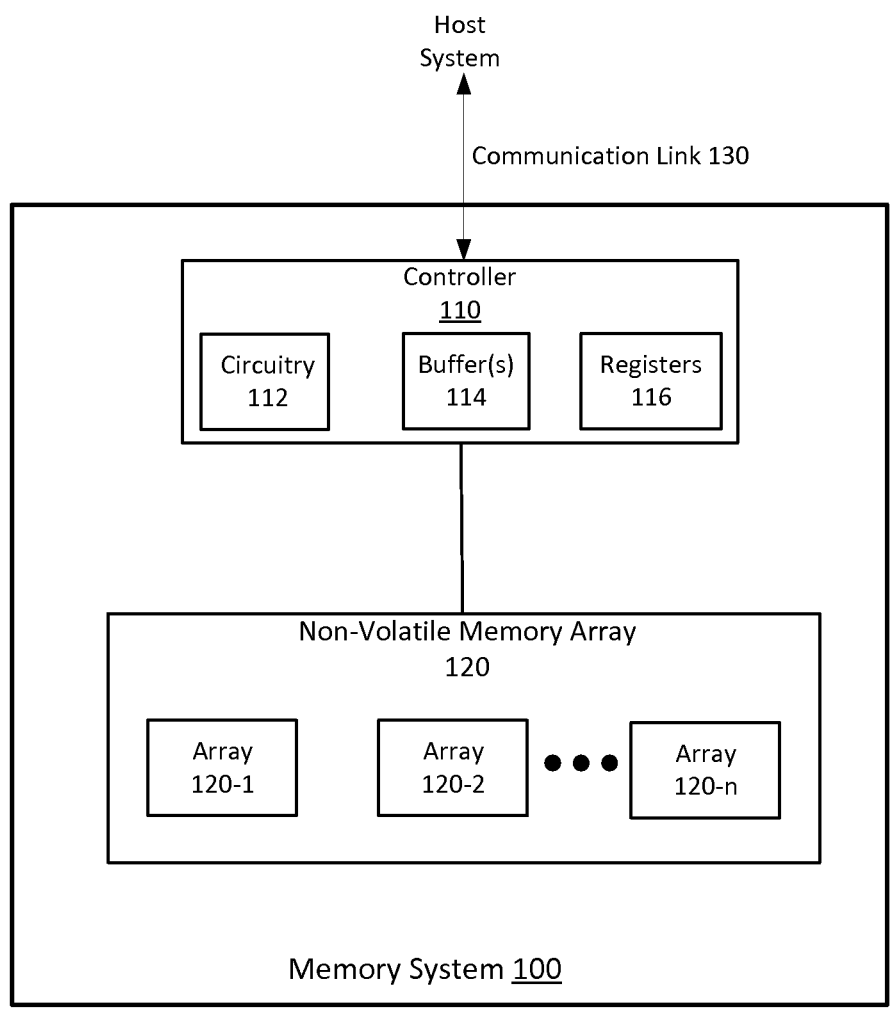
FIG. 1 illustrates an example memory system.

FIG. 1 illustrates an example memory system 100. As shown in FIG. 1, memory system 100 includes a controller 110, a non-volatile memory 120 and a communication link 130. According to some examples, controller 110 may receive and/or fulfill read/write requests via communication link 130 from a host computing device or host system. According to some examples, memory system 100 may operate in compliance with one or more specifications or standards to include the PCIe and/or the NVMe specifications.

In some examples, as shown in FIG. 1, controller 110 may include circuitry 112, buffer(s) 114 and registers 116. As described more below, memory system 100 may be an SSD for a host system and logic and/or features may be executed by circuitry 112 to configure memory system 100 to operate in a storage mode or a memory mode. According to some examples, logic and/or features executed by circuitry 112 may use buffer(s) 114 or registers 116 to configure and/or operate memory system 100 in the storage or the memory modes. For these examples, the storage mode may include the logic and/or features performing operations such as posting and synchronization with results available only after the logic and/or features signal completion of these operations. In contrast, memory mode may be more immediate and results may be available (e.g., to a host system) at completion of a read or write operation. For example, read (a), write (a) for a memory mode may simply include a read (a), followed by a write (a). Meanwhile for a storage mode, the logic and/or features may "set up read transfer from (a) to a DMA address (xx)"; wait for completion; read DMA location (x); set up write transfer from DMA address (xx) to (a); wait for completion.

According to some examples, as shown in FIG. 1, non-volatile memory array 120 includes any number of arrays 120-1, 120-2 to 120-n, where "n" equals any positive integer greater than 2. Arrays 120-1, 120-2 or 120-n may collectively or individually include one or more types of non-volatile memory to include, but not limited to, NAND flash memory, NOR flash memory, 3-D cross-point memory, ferroelectric memory, silicon-oxide-nitride-oxide-silicon (SONOS) memory, polymer memory such as ferroelectric polymer memory, ferroelectric transistor random access memory (FeTRAM) or FeRAM), ovonic memory, nanowire or electrically erasable programmable read-only memory (EEPROM).

According to some examples, controller 110 may include logic and/or features to receive one or more configuration commands. For these examples, the one or more configuration commands may be in accordance with the PCIe or NVMe specifications and may be received via communication link 130 from a host computing device or system. The logic and/or features of controller 110 may then configure memory system 100 to operate in a storage mode, a memory mode or a combination of the storage mode and the memory mode based on the one or more configuration commands. Depending on the mode of operation, the logic and/or features of controller 110 may set one or more control registers included in registers 116 to indicate the mode of operation. The control registers included in registers 116 may be used by controller 110 and/or devices accessing non-volatile memory 120 to determine what mode(s) of operation for memory system 100 are available for accessing at least a portion of arrays 120-1 to 120-n.

In some examples, buffer(s) 114 may be utilized by logic and/or features of controller 110 to facilitate operating memory system 100 in a memory mode of operation. For example, one or more buffers may be arranged or maintained by the logic and/or features to at least temporarily store small amounts of data written to or read from non-volatile memory 120. The temporary storage of the small amounts of data may enable controller 110 to more efficiently handle bursts of activity from the host system and thus preserve some atomicity regardless of a size of an access to or from non-volatile memory 120.

Figure 2:
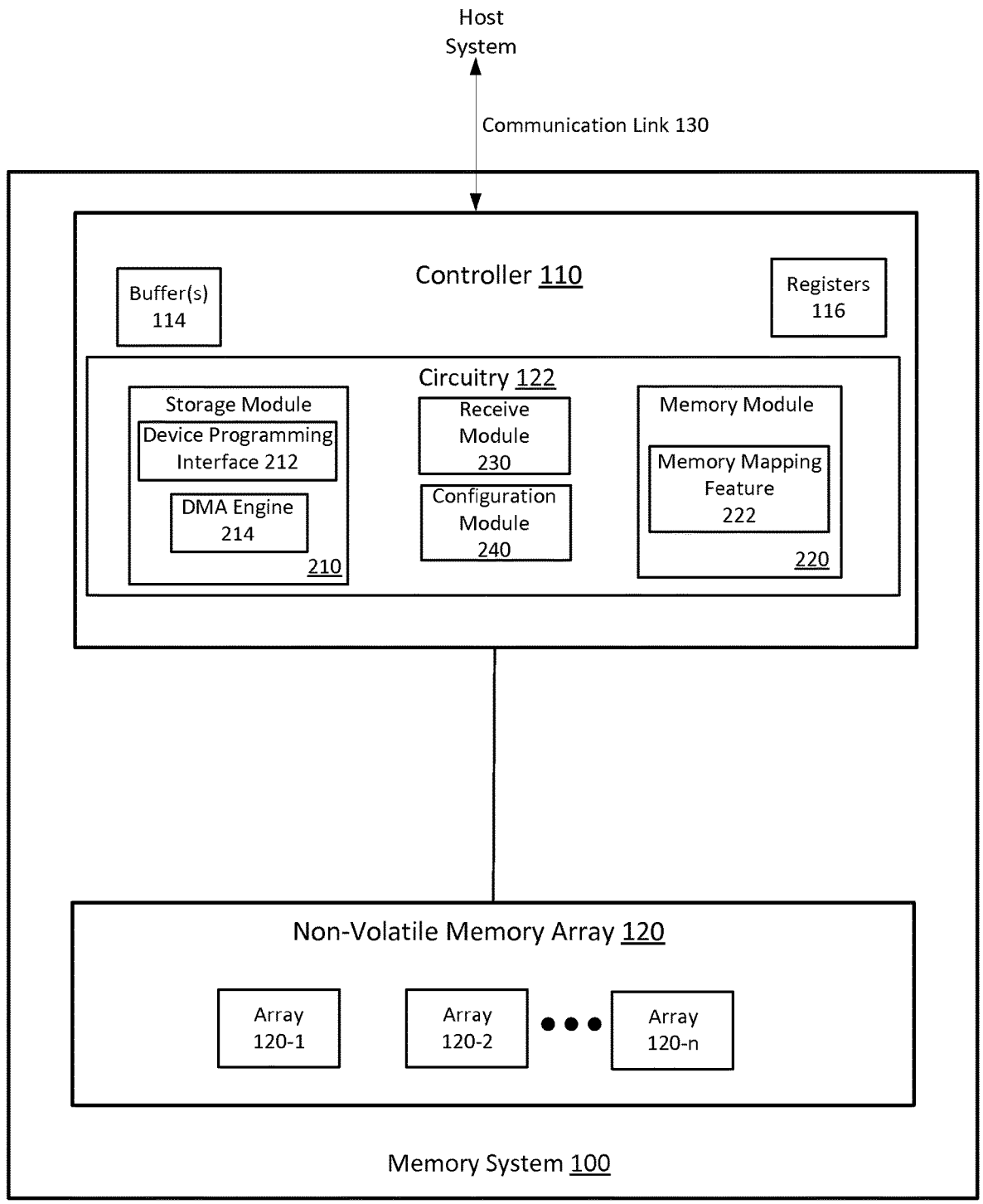
FIG. 2 illustrates example modules included in circuitry for the example memory system.

FIG. 2 illustrates example modules included in circuitry 122 for the example memory system 100. In some examples, as shown in FIG. 2, circuitry 122 includes a storage module 210, a memory module 220, a receive module 230 and a configuration module 240. For these examples, storage module 210, memory module 220, receive module 230 and configuration module 240 may incorporate at least some of the logic and/or features to receive configuration command(s), configure, and then operate memory system 100 in a storage and/or memory mode.

In some examples, as shown in FIG. 2, storage module 210 includes a device programming interface 212 and a direct memory access (DMA) engine 214. Also, memory module 220 is shown as including memory mapping feature 222. For these examples, circuitry 122 may be a processor circuit arranged to or capable of executing storage module 210, memory module 220, receive module 230 or configuration module 240.

According to some examples, receive module 230 may be capable of receiving one or more configuration commands to operate memory system in at least one of a storage mode or a memory mode. For these examples, the one or more configuration commands may be PCIe or NVMe compliant configuration commands received from a host system coupling to memory system 100. Although this disclosure is not limited to receipt of PCIe or NVMe compliant configuration commands from only the host system. In other examples, at least a portion of the configuration commands may have originated from a remote computing device that may have routed the one or more configuration commands through the host system in order to configure memory system 100. For examples, the remote computing device may route NVMe configuration commands to enable remote DMA (RDMA) functionality for the remote computing device. As part of enabling RDMA functionality, configuration module 240 may cause at least a portion of arrays 120-1 to 120-n to be operated by storage module 210 in a storage mode of operation.

In some examples, configuration module 240 may be capable of causing memory system 100 to be operated in a storage mode by default. For these examples, the default storage mode may occur upon initial startup or initialization of memory system 100. Subsequent to initial startup and responsive to receive module 230 receiving the one or more configuration commands, configuration module 240 may then configure memory system 100 to operate in at least one of the storage mode or the memory mode. According to some examples, the default storage mode may include memory system 100 operating first as a PCIe storage device and then transitioning to operate in a combination of storage and memory mode or to a pure memory mode of operation.

According to some examples, DMA engine 214 may provide storage module 210 with DMA capabilities to access one or more arrays 120-1 to 120-n. Also, device programming interface 212 may facilitate or coordinate storage of data (e.g., from the host system) to at least a portion of arrays 120-1 to 120-n via use of DMA engine 214. For these examples, the storage mode of operation for memory system 100 may maintain most of the DMA intelligence or control for access of non-volatile memory array 120 with circuitry 122 and to a broader extent controller 110. This may be in contrast to a memory mode of operation that may move most of the intelligence for accessing at least the memory mode portions of non-volatile memory 120 to logic and/or features of the host system. As a result of moving most of the intelligence to the host system, for a PCIe compliant memory system 100, control may appear to reside on the root-port side of a PCIe interface maintained at controller 110.

In some examples, memory mapping feature 222 may be a feature of memory module 220 that enables memory module 220 to cause at least a portion of arrays 120-1 to 120-n to be addressable via a memory mapping configuration command included in the one or more configuration commands received (e.g., from the host system). For example, the memory mapping configuration command included in the received one or more configuration commands may include a PCIe or NVMe memory mapping configuration command that may result in memory mapping feature 222 causing at least the portion of arrays 120-1 to 120-n to be addressable to the host system for use as system memory. Being addressable may include an ability to map to a PCIe or NVMe configuration space for memory system 100 at defined offsets within an addressable range associated with at least the portion of arrays 120-1 to 120-n. The addressable range, for example, may include the range of physical memory addresses associated with these arrays.

According to some examples, based on received configuration commands, configuration module 240 may configure one or more control registers included in registers 116. For these examples, the control registers, once configured, may indicate whether memory system 100 is to operate in a storage mode, a memory mode or a combination of storage mode or memory mode. In some examples, the one or more control registers may cause elements of circuitry 122 to be at least temporarily disabled. For example, if only a memory mode of operation was set for memory system 100, the control registers may be configured to cause elements of storage module 210 such as DMA engine 214 and/or device programming interface 212 to become disabled or inaccessible to a host system or other computing devices coupling to memory system 100. As a result, memory system 110 may merely appear to the host system as a memory device to be used for system memory and would not appear as a storage device.

FIG. 3 illustrates example first address tables. In some examples, as shown in FIG. 3, the example first address tables include logical block address table 310 and physical block address table 320. For these examples, logical block address table 310 includes a range of logical block addresses 312-1 to 312-9. Also, for these examples, the range of logical block address may map to or may be associated with physical block addresses for arrays 120-1 to 120-*n* included in non-volatile memory 120. Physical block addresses for array 120-1 are depicted in physical block address table 320 as 330-1, 330-2 and 330-*p*. Physical block addresses for array 120-2 are depicted in physical block address table 320 as 340-1, 340-2 and 340-*q*. Physical block addresses for array 120-*n* are depicted in physical block address table 320 as 350-1, 350-2 and 350-*r*. For these examples, "p", "q" or "r" may separately represent any positive integer greater than 2.

According to some examples, logic and/or features executed by circuitry 122 for controller 110 (e.g., configuration module 240) may configure memory system 100 to operate in at least one of a storage mode or a memory mode by causing or setting up partitions 315 and 325. For these examples, as shown in FIG. 3, partition 315 includes array 120-1 and partition 325 includes arrays 120-2 to 120-*n*. Also, as shown in FIG. 3, the physical block addresses for array 120-1 may be mapped to logical block addresses 312-1 to 312-3 and assigned to the memory mode of operation. The physical block addresses for arrays 120-2 to 120-*n* may be mapped to logical block address 312-4 to 312-9 and assigned to the storage mode of operation.

In some examples, based on the assignment of the physical block addresses associated with partition 315 being assigned to the memory mode, mapping feature 222 of memory module 220 may allow or cause these physical block addresses to be addressable via a memory mapping configuration command. The memory mapping configuration command, for example, may be received from the host system. The memory mapping configuration command may be formatted according to the PCIe or NVMe specifications. For these examples, partition 315 of memory system 100 may now be capable of serving as at least a portion of system memory for the host system. In some examples, most if not all of the intelligence for deciding placement of data in partition 315 may now be transferred from controller 110 to the host system.

According to some examples, based on the assignment of the physical block addresses associated with partition 325 being assigned to the storage mode, device programming interface 212 and DMA engine 214 may enable the host system to use partition 325 for storing data. For these examples, the logical block addresses associated with physical block addresses for arrays 120-2 to 120-*n* may be utilized by DMA engine 214 for storage of data to these arrays based on instructions received from the host system via device programming interface 212. Since elements of storage module 210 decide what actual physical block address to store data, at least some intelligence remains with controller 110 for storing data to partition 325. Partition 325 may thus appear to host system as a typical storage device FIG. 4 illustrates example second address tables. In some examples, as shown in FIG. 4, the example second address tables include a logical block address table 410 and a physical block address table 420. For these examples, logical block address table 410 includes a similar range of logical blocks as did logical block address table 310. However, two differences are shown FIG. 4. First, partition 415 and partition 425 have some overlapping physical block address assignments. For example, physical block address 440-1 for array 120-2 is included in both partitions and has been mapped to both logical block addresses 412-3 and 412-7. Second, partition 425 includes non-contiguous physical addresses. For example, partition 425 includes physical addresses from each of arrays 120-1 to 120-*n* but does not include all of the physical block addresses for array 120-2.

According to some examples, the overlapping of physical block addresses may afford controller 110 some dynamic flexibility when operating memory system 100 in a combined storage and memory mode. The host system may have variable demands for storing either large amounts of data or needing more system memory capacity. Storing large amounts of data may include, but is not limited to, storage of high resolution photographs, video or large documents. Needing more system memory capacity, may include but is not limited to the host system running graphic intensive applications such as interactive gaming applications or 3-dimensional renderings applications.

Although FIG. 4 shows partition 425 including a larger portion of the physical block addresses compared to those included in partition 415. Other examples are contemplated where the partition assigned to the memory mode has a relatively larger portion of physical block addresses compared to the partition assigned to the storage mode. The relative portions assigned to either mode may be dependent on the types of usage models for the host system coupling to memory system 100.

Also, more overlapping of physical addresses may occur to afford even greater flexibility to use the arrays of non-volatile memory for either storage operations or to augment system memory. Storage module 210 and memory module 212 may include some capabilities to coordinate storing data to these overlapping physical block addresses to ensure data is not overwritten to the same physical block addresses. For example, either module may flag an address as occupied and periodically send updates to the other module to indicate whether that occupied status has changed.

According to some examples, although not shown in FIG. 3 or 4, all arrays of non-volatile memory 120 may be assigned to either the storage mode or to the memory mode.

Figure 5:
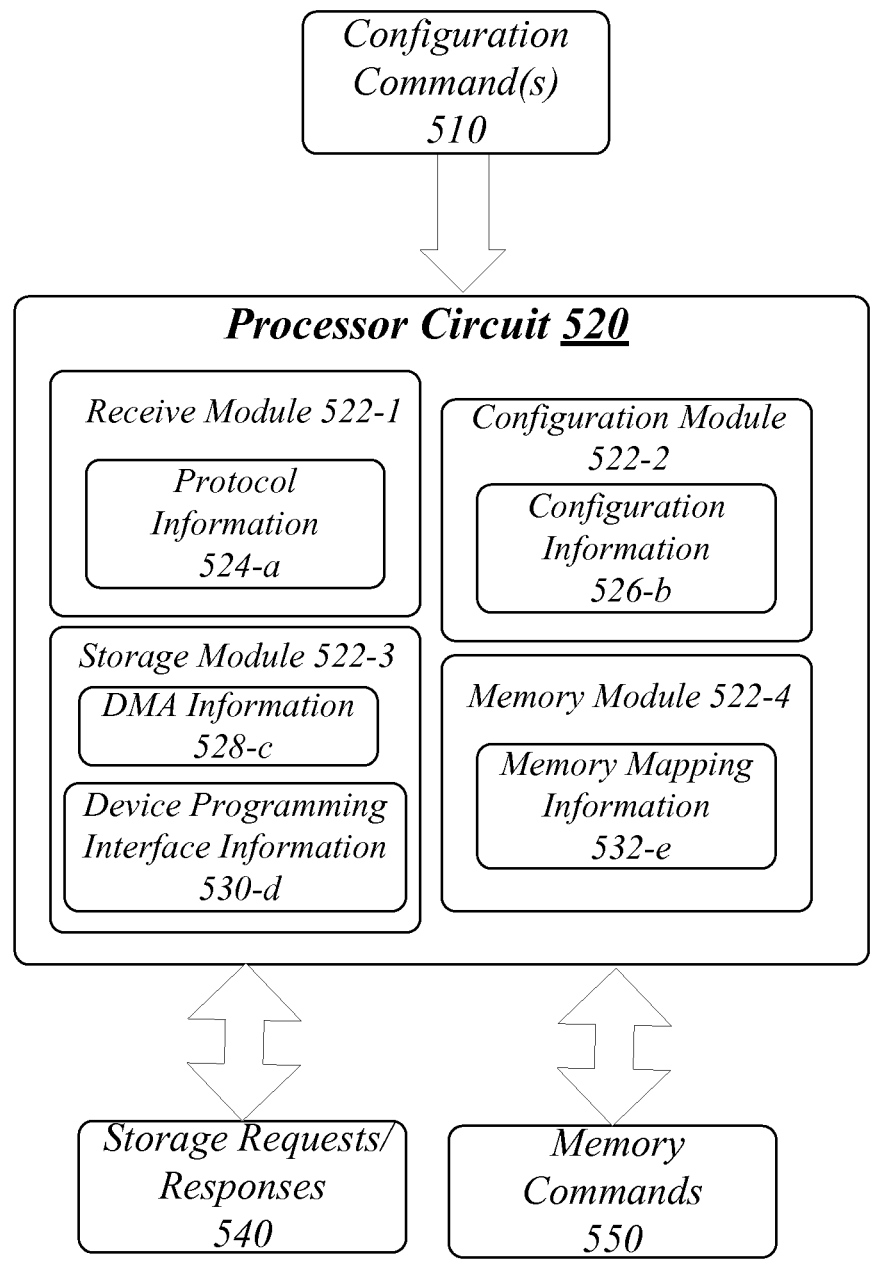
FIG. 5 illustrates an example apparatus.

FIG. 5 illustrates an example apparatus 500. Although the apparatus 500 shown in FIG. 5 has a limited number of elements in a certain topology, it may be appreciated that the apparatus 500 may include more or less elements in alternate topologies as desired for a given implementation.

The apparatus 500 may comprise a computer-implemented apparatus that may include at least some of the logic and/or features mentioned above for controller 110 for FIGS. 1-4. The computer-implemented apparatus 500 may be arranged to execute one or more software modules 522-*a*. It is worthy to note that "a" and "b" and "c" and similar designators as used herein are intended to be variables representing any positive integer. Thus, for example, if an implementation sets a value for a=4, then a complete set of software modules 522-*a* may include modules 522-1, 522-2, 522-3 or 522-4. The examples are not limited in this context.

According to some examples, apparatus 500 may be capable of being located with a memory system such as memory system 100 (e.g., included in controller 110). For these examples, apparatus 500 may be included in or implemented by a processor or processor circuitry. In other examples, apparatus 500 may be implemented as part of firmware for a controller of the memory system. The examples are not limited in this context.

In some examples, if implemented in a processor, the processor may be generally arranged to execute one or more modules 522-*a*. The processor can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Pentium®, and XScale® processors; and similar processors. Multi-core processors and other multi-processor/core architectures may also be employed to implement apparatus 500.

According to some examples, apparatus 500 may include a receive module 522-1. Receive module 522-1 may be executed by processor circuit 520 to receive configuration command(s) 510. For these examples, configuration command(s) 510 may be received from a host system coupled to the memory system that includes apparatus 500. Configuration command(s) 510 may be formatted in compliance with one or more industry standards to include PCIe or NVMe. Receive module 522-1 may maintain protocol information 524-*a* (e.g., stored in a data structure such as a lookup table (LUT)) to interpret PCIe or NVMe configuration commands included in configuration command(s) 510.

In some examples, apparatus 500 may also include a configuration module 522-2. Configuration module 522-2 may be executed by processor circuit 520 to cause the memory system to be configured to operate in at least one of a storage mode or a memory mode based on the received configuration command(s) 510. Configuration module 522-2 may maintain configuration information 526-*b* in either a LUT or via use of registers such as registers 116 mentioned above for memory system 100. Configuration information 526-*b* may indicate partitioning of one or more non-volatile memory arrays included in the memory system for use in the memory mode or the storage mode. According to some examples, configuration information 526-*b* may also indicate whether elements associated with unassigned modes have been disabled. For examples, registers such as registers 116 may be used to indicate which elements have been disabled.

In some examples, apparatus 500 may also include a storage module 522-3. Storage module 522-3 may be executed by processor circuit 520 to operate the memory system in the storage mode. For these examples, DMA information 528-*c* may include information or instructions maintained by storage module 522-3 (e.g., in a LUT) that may be associated with DMA capabilities to access one or more non-volatile memory arrays configured or assigned to operate in the storage mode. Device programming interface information 530-*d* may also be maintained by storage module 522-3 (e.g., in the LUT) and may include instructions to enable storage module 522-3 to coordinate storage requests/responses 540 to the one or more non-volatile memory arrays via use of the DMA capabilities.

According to some examples, apparatus 500 may also include a memory module 522-4. Memory module 522-4 may be executed by processor circuit 520 to operate the memory system in the memory mode. For these examples, memory mapping information 532-*e* may include information to indicate which non-volatile memory cells have been configured or assigned to operate in the memory mode. Memory module 522-4 may maintain memory mapping information 532-*e* in a LUT and may use memory mapping information 532-*e* to cause or enable at least a portion of the non-volatile memory cells of the memory system to be addressable. The portion of the non-volatile memory cells may be addressable via a memory mapping configuration command include in received configuration command(s) 510. The memory mapping configuration command may have been sent from the host system for the host system to enable use of the portion of non-volatile memory cells as system memory. Memory module 522-4 may use memory mapping information 532-*e* responsive to memory commands 550 received from the host system.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 6:
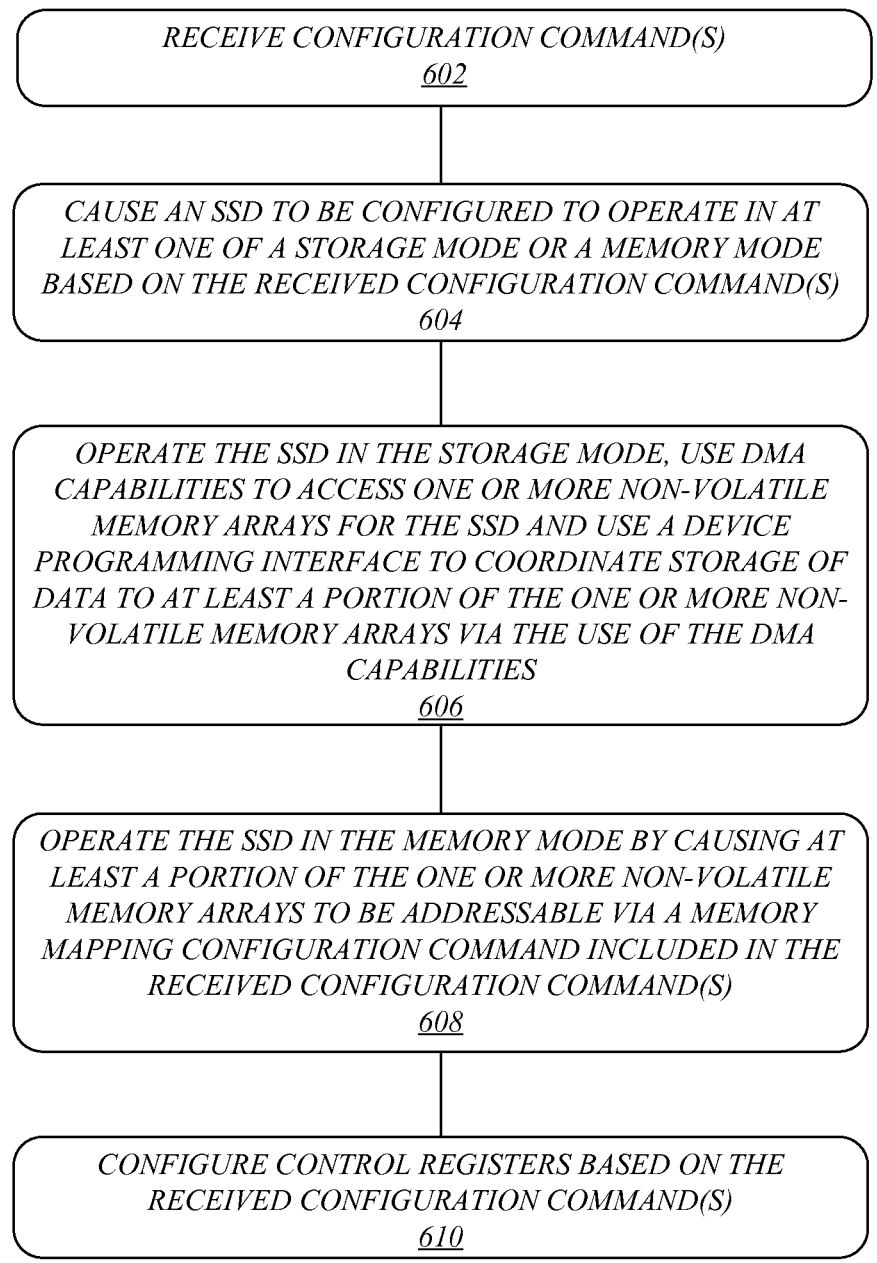
FIG. 6 illustrates an example logic flow.

FIG. 6 illustrates a logic flow 600. Logic flow 600 may be representative of some or all of the operations executed by one or more logic, features, or devices described herein, such as apparatus 500 that may be included with or be a part of a controller for a memory system such as memory system 100. More particularly, logic flow 600 may be implemented by receive module 522-1, configuration module 522-2, storage module 522-3 or memory module 522-4.

According to some examples, logic flow 600 may receive configuration command(s) at block 602. For these examples, the configuration command(s) may be received by receive module 522-1 and may be received from a host system or computing device coupled to a memory system such as an SSD having a controller that includes apparatus 500.

In some examples, logic flow 600 may cause the SSD to be configured to operate in at least one of a storage mode or a memory mode based on the received configuration command(s) at block 604. For these examples, configuration module 522-2 may configure one or more non-volatile memory arrays to operate in either the storage mode and/or the memory mode.

According to some examples, logic flow 600 may operate the SSD in the storage mode at block 606. Also, logic flow 600 at block 606 may use DMA capabilities to access one or more non-volatile memory arrays for the SSD and use a device programming interface to coordinate storage of data to at least a portion of the one or more non-volatile memory arrays via the use of the DMA capabilities. For these examples, memory module 522-3 may use DMA information 528-c and device programming interface information 530-d to coordinate storage of data responsive to storage requests/responses 540. The storage requests included in storage requests/responses 540 may be coordinated with the host system.

In some examples, logic flow 600 may operate the SSD in the memory mode by causing at least a portion of the one or more non-volatile memory arrays to be addressable via a memory mapping configuration command included in the received configuration command(s) at block 608. For these examples, memory module 522-4 may use memory mapping information 532-e to cause or enable the one or more non-volatile memory arrays to be addressable via the memory mapping configuration command.

According to some examples, logic flow 600 may configure control registers based on the received configuration command(s) at block 610. For these examples, configuration module 522-2 may configure the control registers to indicate modes of operation for the SSDs. The configured control registers may also at least temporarily disable storage module 522-3 if the SSD is configured to only operate in the memory mode. Alternatively, the configured control registers may at least temporarily disable memory module 522-4 if the SSD is configured to only operate in the storage mode.

Figure 7:
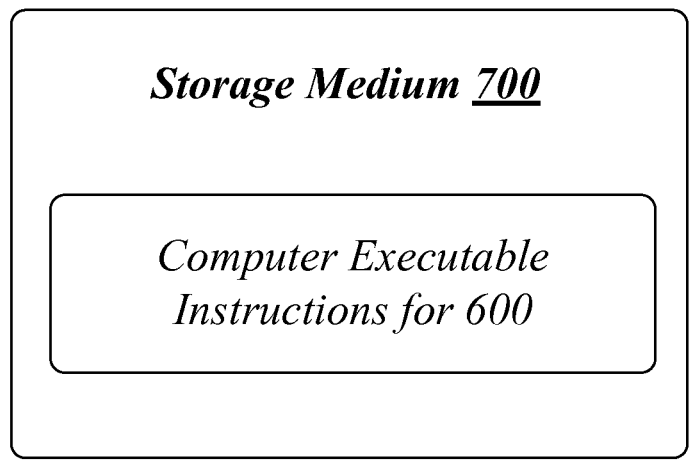
FIG. 7 illustrates an example storage medium.

FIG. 7 illustrates an embodiment of a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
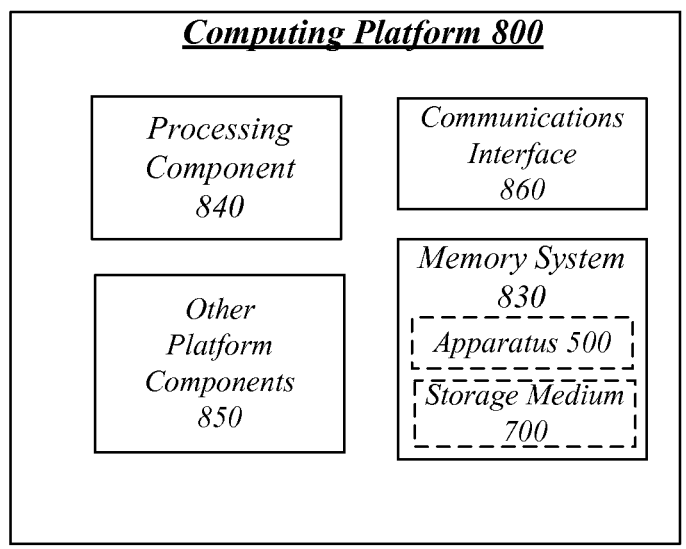
FIG. 8 illustrates an example computing platform.

FIG. 8 illustrates an example computing platform 800. In some examples, as shown in FIG. 8, computing platform 800 may include a memory system 830, a processing component 840, other platform components 850 or a communications interface 860. According to some examples, computing platform 800 may be implemented in a host system or host computing device.

According to some examples, memory system 830 may be similar to memory system 100. For these examples, logic and/or features (e.g., included in a controller) resident at or located with memory system 830 may execute at least some processing operations or logic for apparatus 500. Also, memory system 830 may include non-volatile memory (not shown) that may be written to or read from in a similar manner as described above for memory system 100 and may be configured to use in a storage mode or a memory mode.

According to some examples, processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 850 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units associated with either other platform components 850 or memory system 830 may include without limitation, various types of computer readable and machine readable storage media in the form of one or more higher speed memory units, such as ROM, RAM, DRAM, Double-Data-Rate DRAM (DDRAM), synchronous DRAM (SDRAM), SRAM, programmable ROM (PROM), EPROM, EEPROM, NAND flash memory, NOR flash memory, polymer memory such as ferroelectric polymer memory, ferroelectric transistor random access memory (FeTRAM or FeRAM), nanowire, ovonic memory, ferroelectric memory, 3-dimensional cross-point memory, SONOS memory, magnetic or optical cards, an array of devices such as Redundant Array of Independent Disks (RAID) drives, solid state memory devices (e.g., USB memory), SSDs and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols or standards described in one or more industry standards (including progenies and variants) such as those associated with the System Management Bus (SMBus) specification, the PCIe specification, the NVMe specification, the Serial Advanced Technology Attachment (SATA) specification or the Universal Serial Bus (USB) specification. Network communications may occur via use of communication protocols or standards such as those described in the Ethernet standard.

Computing platform 800 may be part of a host system or host computing device that may be, for example, user equipment, a computer, a personal computer (PC), a desktop computer, a laptop computer, a notebook computer, a netbook computer, a tablet computer, a tablet, a portable gaming console, a portable media player, a smart phone, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 800 described herein, may be included or omitted in various embodiments of computing platform 800, as suitably desired.

The components and features of computing platform 800 may be implemented using any combination of discrete circuitry, application specific integrated circuits (ASICs), logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

According to some examples, an example apparatus may include a processor circuit. The example apparatus may also include a receive module for execution on the processor circuit to receive one or more configuration commands and a configuration module for execution on the processor circuit to cause an SSD to be configured to operate in at least one of a storage mode or a memory mode based on the received one or more configuration commands. The example apparatus may also include a storage module for execution on the processor circuit to operate the SSD in the storage mode. The storage module may have DMA capabilities to access one or more non-volatile memory arrays for the SSD and may also have a device programming interface to coordinate storage of data to at least a portion of the one or more non-volatile memory arrays via use of the DMA capabilities. The example apparatus may also include a memory module for execution on the processor circuit to operate the SSD in the memory mode. The memory module may cause at least a portion of the one or more non-volatile memory arrays to be addressable via a memory mapping configuration command included in the received one or more configuration commands.

In some examples, the example apparatus may also include control registers associated with the SSD. The control registers may be configured by the configuration module based on the received one or more configuration commands. The configured control registers may indicate whether the SSD is to operate in a storage mode, a memory mode or a combination of storage mode and memory mode.

According to some examples for the example apparatus, the configuration module may partition the SSD to operate in the storage mode or the memory mode such that a first portion of the one or more non-volatile memory arrays are included in a first partition and a second portion of the one or more non-volatile memory arrays are included in a second partition. The first partition mat be operated in the storage mode and the second partition operated in the memory mode.

In some examples for the example apparatus, causing the SSD to be configured to operate in at least one of the storage mode or the memory mode may include the configuration module assigning logical block addresses associated with the storage mode. For these examples, at least some of the assigned logical block addresses may be capable of being mapped to one or more physical memory address associated with the portion of the one or more non-volatile memory arrays to be addressable via the memory mapping configuration command.

According to some examples for the example apparatus, the configuration module may cause the DMA capabilities and the device programming interface of the storage module to be disabled based on the one or more configuration commands including an indication to operate the SSD in only a memory mode of operation.

In some examples for the example apparatus, the one or more configuration commands may include PCIe configuration commands arranged in compliance with an industry standard to include PCIe Base Specification, revision 3.0 or NVMe Specification, revision 1.1.

According to some examples for the example apparatus, the one or more configuration commands may be received from a host system coupled to the SSD.

In some examples for the example apparatus, the memory mapping configuration command included in the received one or more configuration commands may include a PCIe or NVMe memory mapping configuration command. The memory module may cause the portion of the one or more non-volatile memory arrays to be addressable to the host system for use as system memory based on the PCIe or NVMe mapping configuration command.

According to some examples for the example apparatus, the configuration module may configure the SSD to initially operate in a storage mode by default and then cause the SSD to be configured to operate in at least one of the storage mode or the memory mode based on the received one or more PCIe or NVMe configuration commands.

In some examples for the example apparatus, the one or more non-volatile memory arrays may include at least one of 3-dimensional cross-point memory, flash memory, ferroelectric memory, SONOS memory, polymer memory, nanowire, FeTRAM, FeRAM, nanowire or EEPROM.

In some examples, example methods may include receiving one or more configuration commands at a controller for an SSD having one or more non-volatile memory arrays. The example methods may also include configuring the SSD to operate in a memory mode or a combination of a storage mode and the memory mode based on the one or more configuration commands.

According to some examples. the example methods may also include setting one or more control registers associated with the SSD to indicate whether the SSD is configured to operate in the memory mode or the combination of the storage mode and the memory mode.

In some examples for the example methods, operating the SSD in the storage mode may include providing DMA capabilities to access the one or more non-volatile memory arrays and coordinating storage of data to at least a portion of the one or more non-volatile memory arrays through a device programming interface.

According to some examples for the example methods, operating the SSD in the memory mode may include causing at least a portion of the one or more non-volatile memory arrays to be addressable via a memory mapping configuration command included in the received one or more configuration commands.

In some examples for the example methods, operating the SSD in the combination of storage mode and the memory mode may include partitioning the SSD such that a first portion of the one or more non-volatile memory arrays are included in a first partition and a second portion of the one or more non-volatile memory arrays are included in a second partition. Operating the SSD in the combination of storage mode and the memory mode may also include assigning the first partition to the storage mode of operation and assigning the second partition to the memory mode of operation.

According to some examples for the example methods, the one or more configuration commands may include PCIe configuration commands arranged in compliance with an industry standard to include PCIe Base Specification, revision 3.0 or NVMe Specification, revision 1.1.

In some examples for the example methods, receiving the one or more configuration commands from a host computing device and operating the SSD in the memory mode. The received one or more configuration commands may include a PCIe or NVMe memory mapping configuration command that causes at least a portion of the one or more non-volatile memory arrays to be addressable to the host computing device for use as system memory by the host computing device.

According to some examples, the example methods may also include operating the SSD in a storage mode at initial startup of the SSD and responsive to receiving the one or more PCIe or NVMe configuration commands, configuring the SSD to operate in at least one of the storage mode or the memory mode based on the one or more PCIe or NVMe configuration commands.

In some examples for the example methods, the one or more non-volatile memory arrays may include at least one of 3-dimensional cross-point memory, flash memory, ferroelectric memory, SONOS memory, polymer memory, nanowire, FeTRAM, FeRAM, nanowire or EEPROM According to some examples, at least one machine readable medium comprising a plurality of instructions that in response to being executed on a system cause the system to carry out the example method as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving information to configure a memory device having one or more non-volatile memory arrays; and
   configuring the memory device to operate in a memory mapping mode or a combination of a direct access storage mode and the memory mapping mode, based on the information.

2. The method of claim 1, comprising:
   setting one or more control registers associated with the memory device to indicate whether the memory device is configured to operate in the memory mapping mode or the combination of the direct access storage mode and the memory mapping mode.

3. The method of claim 1, operating the memory device in the direct access storage mode comprises providing direct access capabilities to access the one or more non-volatile memory arrays and coordinating storage of data to at least a portion of the one or more non-volatile memory arrays through a programming interface of the memory device.

4. The method of claim 1, to operate the memory device in the memory mapping mode comprises causing at least a portion of the one or more non-volatile memory arrays to be addressable via a memory mapping configuration command included in the received information to configure the memory device.

5. The method of claim 1, to operate the memory device in the combination of direct access storage mode and the memory mapping mode comprises:
   partitioning the one or more non-volatile memory arrays such that a first portion of the one or more non-volatile memory arrays is included in a first partition and a second portion of the one or more non-volatile memory arrays is included in a second partition;
   assigning the first partition to the direct access storage mode of operation; and
   assigning the second partition to the memory mapping mode of operation.

6. The method of claim 1, the received information to configure the memory device comprises one or more Peripheral Component Interconnect (PCI) Express (PCIe) configuration commands arranged in compliance with PCIe Base Specification, revision 3.0 or Non-Volatile Memory Express (NVMe) Specification, revision 1.1.

7. The method of claim 6, comprising receiving the one or more PCIe configuration commands from a host computing device and operating the memory device in the memory mapping mode, the received one or more PCIe configuration commands including a PCIe or NVMe memory mapping configuration command that causes at least a portion of the one or more non-volatile memory arrays to be addressable to the host computing device for use as system memory by the host computing device.

8. The method of claim 6, comprising:
   operating the memory device in a direct access storage mode at initial startup of the memory device, and responsive to receiving the one or more PCIe configuration commands, configuring the memory device to operate in at least one of the direct access storage mode or the memory mapping mode based on the one or more PCIe configuration commands.

9. The method of claim 1, the one or more non-volatile memory arrays comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

10. The method of claim 1, the memory device comprising a solid state drive (SSD).

11. At least one machine readable medium comprising a plurality of instructions that in response to being executed on a system cause the system to:
    receive information to configure a memory device having one or more non-volatile memory arrays; and
    configure the memory device to operate in a memory mapping mode or a combination of a direct access storage mode and a memory mapping mode based on the information.

12. The at least one machine readable medium of claim 11, the instructions to cause the system to operate the memory device in the memory mapping mode comprises the system to cause at least a portion of the one or more non-volatile memory arrays to be addressable via a memory mapping configuration command included in the received information to configure the memory device.

13. The at least one machine readable medium of claim 11, the instructions to cause the system to operate the memory device in the combination of direct access storage mode and the memory mapping mode comprises the system to:
    partition the one or more non-volatile memory arrays such that a first portion of the one or more non-volatile memory arrays is included in a first partition and a second portion of the one or more non-volatile memory arrays is included in a second partition;
    assign the first partition to the direct access storage mode of operation; and
    assign the second partition to the memory mapping mode of operation.

14. The at least one machine readable medium of claim 11, the received information to configure the memory device received from a host computing device coupled with the memory device, the information comprising one or more Peripheral Component Interconnect (PCI) Express (PCIe) configuration commands arranged in compliance with PCIe Base Specification, revision 3.0 or Non-Volatile Memory Express (NVMe) Specification, revision 1.1, the one or more PCIe configuration commands including a PCIe or NVMe memory mapping configuration command that causes at least a portion of the one or more non-volatile memory arrays to be addressable to the host computing device for use as system memory by the host computing device.

15. The at least one machine readable medium of claim 11, the memory device comprises a solid state drive (SSD).

16. An apparatus comprising:
   control registers associated with a memory device having one or more non-volatile memory arrays; and
   circuitry at a controller for the memory device, the circuitry to:
      receive information to configure the memory device;
      cause the memory device to be configured to operate in at least one of a direct access storage mode, a memory mapping mode or a combination of direct access storage mode and memory mapping mode based on the information; and
      cause the control registers to indicate whether the memory device is to operate in a direct access storage mode, a memory mapping mode or a combination of direct access storage mode and memory mapping mode.

17. The apparatus of claim 16, to operate the memory device in the direct access storage mode comprises to provide direct access capabilities to access the one or more non-volatile memory arrays and coordinate storage of data to at least a portion of the one or more non-volatile memory arrays through a programming interface of the memory device.

18. The apparatus of claim 17, comprising the circuitry to cause the direct access capabilities and the programming interface to be disabled based on the received information including an indication to operate the memory device in only a memory mapping mode of operation.

19. The apparatus of claim 16, further comprising the circuitry to:
   partition the one or more non-volatile memory arrays such that a first portion of the one or more non-volatile memory arrays is included in a first partition and a second portion of the one or more non-volatile memory arrays is included in a second partition;
   assign the first partition to the direct access storage mode of operation; and
   assign the second partition to the memory mapping mode of operation.

20. The apparatus of claim 19, the received information to configure the memory device comprises one or more Peripheral Component Interconnect (PCI) Express (PCIe) configuration commands arranged in compliance with PCIe Base Specification, revision 3.0 or Non-Volatile Memory Express (NVMe) Specification, revision 1.1.

21. The apparatus of claim 20, the one or more PCIe configuration commands received from a host system coupled to the memory device.

22. The apparatus of claim 21, the one or more PCIe configuration commands including a PCIe or NVMe memory mapping configuration command, the circuitry to cause the second portion of the one or more non-volatile memory arrays to be addressable to the host system for use as system memory based on the PCIe or NVMe memory mapping configuration command.

23. The apparatus of claim 20, comprising the circuitry to:
   configure the memory device to initially operate in a direct access storage mode by default; and
   cause the memory device to be configured to operate in at least one of the direct access storage mode or the memory mapping mode based on the received one or more PCIe or NVMe memory mapping configuration commands.

24. The apparatus of claim 16, the one or more non-volatile memory arrays comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

25. The apparatus of claim 16, the memory device comprising a solid state drive (SSD).

* * * * *